(12) United States Patent
Sato

(10) Patent No.: US 7,981,518 B2
(45) Date of Patent: Jul. 19, 2011

(54) THERMOPLASTIC RESIN COMPOSITION EXCELLENT IN BARRIER PROPERTY

(75) Inventor: Kazunobu Sato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 104 days.

(21) Appl. No.: 12/447,162

(22) PCT Filed: Oct. 24, 2007

(86) PCT No.: PCT/JP2007/070707
§ 371 (c)(1),
(2), (4) Date: Apr. 24, 2009

(87) PCT Pub. No.: WO2008/050793
PCT Pub. Date: May 2, 2008

(65) Prior Publication Data
US 2010/0004406 A1    Jan. 7, 2010

(30) Foreign Application Priority Data
Oct. 26, 2006    (JP) .................... 2006-291555

(51) Int. Cl.
*C08L 77/00*    (2006.01)
*B32B 27/34*    (2006.01)
*C08K 5/29*    (2006.01)

(52) U.S. Cl. .................... 428/474.4; 428/34.1; 428/35.7; 428/36.9; 428/474.7; 428/474.9; 428/475.5; 525/420; 525/422; 525/432

(58) Field of Classification Search .................... 525/420, 525/422, 432; 428/34.1, 35.7, 36.9, 474.4, 428/474.7, 474.9, 475.5
See application file for complete search history.

(56) References Cited

U.S. PATENT DOCUMENTS

| | | | |
|---|---|---|---|
| 4,645,823 A | 2/1987 | Ai et al. | |
| 5,268,219 A | 12/1993 | Harada et al. | |
| 5,412,013 A | 5/1995 | Watanabe et al. | |
| 2006/0270799 A1 | 11/2006 | Sato et al. | |
| 2007/0021558 A1* | 1/2007 | Shinohara et al. | 525/66 |
| 2008/0014397 A1* | 1/2008 | Manai et al. | 428/36.9 |

FOREIGN PATENT DOCUMENTS

| | | |
|---|---|---|
| JP | 61 72022 | 4/1986 |
| JP | 2 175757 | 7/1990 |
| JP | 4 120168 | 4/1992 |
| JP | 6 32981 | 2/1994 |
| JP | 11 343408 | 12/1999 |
| JP | 2003 105095 | 4/2003 |
| JP | 2006 176597 | 7/2006 |
| JP | 2007 177208 | 7/2007 |

\* cited by examiner

*Primary Examiner* — Ana L Woodward
(74) *Attorney, Agent, or Firm* — Oblon, Spivak, McClelland, Maier & Neustadt, L.L.P.

(57) ABSTRACT

A thermoplastic resin composition comprising 100 parts by mass of a polyamide resin composition (A) and 0.1 to 10 parts by mass of a carbodiimide compound (B) having two or more carbodiimide groups. The polyamide resin composition (A) contains a polyamide resin (a-1) and nylon 11 and/or nylon 12 (a-2) in an amount of 5 to 95% by mass of the component (a-1) and 95 to 5% by mass of the component (a-2) each based on a total amount of the components (a-1) and (a-2). The polyamide resin (a-1) is constituted by diamine units 70 mol % or more of which are derived from m-xylylenediamine and dicarboxylic acid units 70 mol % or more of which are derived from a $C_4$ to $C_{20}$ $\alpha,\omega$-linear aliphatic dicarboxylic acid. The thermoplastic resin composition is excellent in barrier property, strength and impact resistance, in particular, barrier property to alcohol-containing fuels, and suitably used as various shaped articles such as fuel containers, tubes and parts.

20 Claims, No Drawings

THERMOPLASTIC RESIN COMPOSITION EXCELLENT IN BARRIER PROPERTY

This application is a 371 of PCT/JP07/70707, filed Oct. 24, 2007.

FIELD OF THE INVENTION

The present invention relates to thermoplastic resin compositions excellent in barrier property and mechanical properties such as strength, impact resistance and elongation, and more particularly, to thermoplastic resin compositions having an excellent barrier property which are suitable, in particular, as materials of containers, tubes and parts for use in contact with alcohol-containing fuels.

BACKGROUND ARTS

Containers or tubes of a fuel storage system have been produced from various resin materials, because the weight is reduced; a rust proof treatment is not needed; the freedom of shape is high; the number of processing steps is reduced; and the production process is fully automated. In particular, various automobile parts such as tubes, hoses and fuel-related parts are produced from polyamides such as nylon-11 and nylon-12. The polyamides have been widely used because they are light in weight, free from rust and have a good fuel-barrier property to normal gasoline, thus combining excellent properties required in the application to fuel storage.

In recent requirement in reducing the exhaustion of gasoline sources and protecting the environment, the use of a mixed fuel of gasoline added with an alcohol such as ethanol comes to be considered. However, since polyamides have a considerably low barrier to alcohols, the permeation amount of a mixed gasoline through polyamide reaches as high as 50 to 60 times the permeation amount of a normal gasoline. Therefore, polyamide fails to fully meet the regulations which will be made increasingly strict and a material with a higher barrier is keenly required.

It has been known that the heat resistance of a thermoplastic resin is improved by the addition of a polycarbodiimide (Patent Document 1). It has been also known that the hydrolysis resistance, oil resistance and metal halide resistance of polyamide is improved by the addition of an aliphatic carbodiimide compound (Patent Document 2). However, these patent documents are completely silent about the improvement in the fuel barrier property and mechanical properties such as strength, impact resistance and elongation.

Patent Document 1: JP 02-175757A
Patent Document 2: JP 11-343408A

DISCLOSURE OF THE INVENTION

Problem to be Solved by the Invention

In view of the above problems in the art, an object of the present invention is to provide a thermoplastic resin composition excellent in the barrier property and mechanical properties such as strength, impact resistance and elongation, particularly, a thermoplastic resin composition having a high barrier property and strength enough to use as a material for producing containers, tubes and parts for use in contact with alcohol-containing fuels.

Means for Solving the Problem

As a result of extensive studies in view of the above object, the inventor has found that the above object is achieved by a thermoplastic resin composition obtained by blending a carbodiimide compound to a specific polyamide resin composition containing a barrier polyamide having a m-xylylene skeleton and nylon. The present invention has been accomplished on the basis of this finding.

Thus, the present invention provides the following thermoplastic resin composition and shaped article.

1. A thermoplastic resin composition comprising 100 parts by mass of a polyamide resin composition (A) and 0.1 to 10 parts by mass of a carbodiimide compound (B) having two or more carbodiimide groups, the polyamide resin composition (A) comprising a polyamide resin (a-1) which is constituted by diamine units 70 mol % or more of which are derived from m-xylylenediamine and dicarboxylic acid units 70 mol % or more of which are derived from a $C_4$ to $C_{20}$ $\alpha,\omega$-linear aliphatic dicarboxylic acid and nylon 11 and/or nylon 12 (a-2) in an amount of 5 to 95% by mass of the component (a-1) and 95 to 5% by mass of the component (a-2) each based on a total amount of the components (a-1) and (a-2).

2. The thermoplastic resin composition as mentioned above, wherein 30 mol % or less of the dicarboxylic acid units of the polyamide resin (a-1) are isophthalic acid units.

3. The thermoplastic resin composition as mentioned above, wherein a content of water in the polyamide resin composition (A) is 0.3% by mass or less.

4. The thermoplastic resin composition as mentioned above, wherein the carbodiimide compound (B) is an aliphatic or alicyclic polycarbodiimide compound.

5. A shaped article comprising any one of the thermoplastic resin compositions 1 to 4.

6. The shaped article as mentioned above, which is a multilayer shaped article having at least one layer comprising any one of the thermoplastic resin compositions 1 to 4.

Effect of the Invention

The thermoplastic resin composition of the present invention is produced by melt-kneading the barrier polyamide having a m-xylylene skeleton with nylon-11 and/or nylon-12 having a functional group capable of reacting with a carbodiimide group in the presence of the carbodiimide compound. By such a melt kneading, the barrier polyamide and the compound having a functional group capable of reacting with the carbodiimide group are bonded to each other via the carbodiimide compound, or the barrier polyamide and the compound having a functional group capable of reacting with the carbodiimide compound, thereby increasing the compatibility between these compounds. Therefore, a uniform melt kneading of the barrier polyamide having a m-xylylene skeleton with nylon-11 and/or nylon-12 having excellent flexibility and impact strength, which has been hitherto difficult, can be attained. The thermoplastic resin composition thus obtained is excellent in the barrier property, strength and impact strength.

Therefore, the thermoplastic resin composition of the present invention is excellent in the barrier property, strength and impact resistance, particularly in the barrier property to alcohol-containing fuels, and suitably usable in the production of various shaped articles for use in a fuel system such as fuel containers, tubes and parts.

BEST MODE FOR CARRYING OUT THE INVENTION

The polyamide resin composition (A) contains a polyamide resin (a-1). The polyamide resin (a-1) is constituted by diamine constitutional units and dicarboxylic acid constitutional units, 70 mol % or more of the diamine constitutional units being derived from m-xylylenediamine and 70 mol % or more of the dicarboxylic acid constitutional units being derived from a $C_4$ to $C_{20}$ α,ω-linear aliphatic dicarboxylic acid.

Examples of diamines other than m-xylylenediamine for the diamine constitutional units include aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin (inclusive of structural isomers) and bis(aminomethyl)tricyclodecane (inclusive of structural isomers); and aromatic ring-containing diamines such as bis(4-aminophenyl) ether, p-phenylenediamine, p-xylylenediamine and bis(aminomethyl)naphthalene (inclusive of structural isomers). The diamines other than m-xylylenediamine may be used alone or in combination of two or more.

The content of the constitutional units derived from m-xylylenediamine in the whole diamine constitutional units of the polyamide resin (a-1) is 70 mol % or more and preferably 80 mol % or more.

Examples of the $C_4$ to $C_{20}$ α,ω-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecanedioic acid, with adipic acid being preferred. These dicarboxylic acids may be used alone or in combination of two or more.

The dicarboxylic acid constitutional units may include constitutional units derived from isophthalic acid preferably in an amount of 30 mol % or less, more preferably 0 to 25 mol % and still more preferably 5 to 20 mol %. As compared with a polyamide resin in which the dicarboxylic acid constitutional units contain only the units derived from the $C_4$ to $C_{20}$ α,ω-linear aliphatic dicarboxylic acid, a polyamide resin containing the units derived from isophthalic acid has a lower melting point and can be formed at lower temperatures, thereby reducing the energy consumed in the production and shortening the shaping cycle. In addition, since the melt viscosity is high and the drawdown of the resin is avoided, the formability of the resin is improved. However, a thermoplastic resin composition containing such a polyamide resin has a lowered barrier property.

Examples of dicarboxylic acids for the dicarboxylic acid constitutional unit, other than the $C_4$ to $C_{20}$ α,ω-linear aliphatic dicarboxylic acid and isophthalic acid, include phthalic acid compounds such as terephthalic acid and orthophthalic acid; naphthalenedicarboxylic acid isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid and 2,7-naphthalenedicarboxylic acid; monocarboxylic acids such as benzoic acid, propionic acid and butyric acid; polycarboxylic acids such as trimellitic acid and pyromellitic acid; and carboxylic acid anhydrides such as trimellitic anhydride and pyromellitic anhydride.

The content of the constitutional units derived from the $C_4$ to $C_{20}$ α,ω-linear aliphatic dicarboxylic acid in the whole dicarboxylic acid constitutional units of the polyamide resin (a-1) is 70 mol % or more and preferably 80 mol % or more.

The polyamide resin (a-1) is produced by polycondensing a diamine component containing m-xylylenediamine in an amount of 70 mol % or more with a dicarboxylic acid component containing the $C_4$ to $C_{20}$ α,ω-linear aliphatic dicarboxylic acid in an amount of 70 mol % or more. The method for the production is not particularly limited and a known method such as an atmospheric melt polymerization and a pressure melt polymerization under known conditions may be employed. For example, the polyamide resin (a-1) may be produced by a method in which a m-xylylenediamine—adipic acid nylon salt or a m-xylylenediamine—adipic acid—isophthalic acid nylon salt is heated under pressure in the presence of water, and then, the nylon salt is polycondensed in a molten state while removing the water added and eliminated by the condensation reaction; or a method in which m-xylylenediamine is added directly to a molten adipic acid or a molten mixture of adipic acid and isophthalic acid, thereby allowing the polycondensation to proceed under atmospheric pressure. The latter method is carried out without solidifying the reaction system by continuously adding m-xylylenediamine so as to heat the reaction system, thereby keeping the reaction temperature not lower than the melting point of oligoamide and polyamide being produced.

Into the polycondensation system for producing the polyamide resin (a-1), a lactam such as ε-caprolactam, ω-laurolactam and ω-enantholactam, and an amino acid such as 6-aminocaproic acid, 7-aminoheptanoic acid, 11-aminoundecanoic acid, 12-aminododecanoic acid, 9-aminononanoic acid and p-aminomethylbenzoic acid may be added, unless the properties of the polyamide resin to be produced are adversely affected.

The polyamide resin (a-1) may be heat-treated to increase the melt viscosity. The heat treatment may be conducted, for example, by a method in which the polyamide resin is gently heated for crystallization without causing fusion in the presence of water in an inert gas atmosphere or under reduced pressure using a batch type heater such as a rotary drum and crystallized while avoiding fusion, and then, the crystallized polyamide resin is further heat-treated; a method in which the polyamide resin is heated and crystallized in an inert gas atmosphere in a grooved stirring heater, and then, the crystallized polyamide resin is further heat-treated in an inert gas atmosphere in a hopper heater; or a method in which the polyamide resin is crystallized in a grooved stirring heater, and then, the crystallized polyamide resin is heat-treated in a batch type heater such as a rotary drum, with the method in which the crystallization and the heat treatment are performed in a batch type heater being preferred. The heat treatment is preferably conducted under the following conditions: crystallizing the melt-polymerized polyamide resin by heating from 70° C. to 120° C. over 0.5 to 4 h in the presence of water in an amount of 1 to 30% by mass of the melt-polymerized polyamide resin, and then, heat treating the crystallized polyamide resin at a temperature in the range of (melting point of the polyamide resin (a-1)–50° C.) to (melting point of the polyamide resin (a-1)–10° C.) for 1 to 12 h in an inert gas atmosphere or under reduced pressure.

The melting point of the polyamide resin (a-1) is preferably from 160 to 240° C., more preferably from 170 to 235° C. and still more preferably from 180 to 230° C.

The glass transition point of the polyamide resin (a-1) is preferably from 80 to 130° C. If being 80° C. or higher, a high barrier property is obtained even at high temperatures.

The polyamide resin (a-1) having an end amino concentration of less than 40 µeq/g, preferably from 10 to 30 µeq/g and an end carboxyl concentration of from 40 to 100 µeq/g is preferably used. If the end amino concentration and end carboxyl concentration are within the above ranges, the yellowing of the barrier layer (layer (I)) to be obtained can be avoided.

The polyamide resin (a-1) may contain a phosphorus compound to enhance the processing stability in a melt forming operation or prevent undesirable discoloration. Preferred is a phosphorus compound containing an alkali metal or an alkaline earth metal. Examples thereof include phosphates, hypophosphites and phosphites of sodium, magnesium, calcium, etc., with hypophosphites of an alkali metal or alkaline earth metal being preferred because of their excellent effect of preventing the discoloration of the polyamide resin. The concentration of the phosphorus compound in the polyamide resin (a-1) is 200 ppm or less, preferably 160 ppm or less and more preferably 100 ppm or less when expressed by the amount of phosphorus atom.

The polyamide resin (a-1) may contain, in addition to the phosphorus compound, various additives such as, but not limited to, lubricant, deslustering agent, heat stabilizer, weathering stabilizer, ultraviolet absorber, nucleating agent, plasticizer, flame retardant, antistatic agent, anti-discoloring agent and anti-gelling agent, unless the effects of the present invention are adversely affected.

The polyamide resin composition (A) contains 5 to 95% by mass of the component (a-1) and 95 to 5% by mass of the component (a-2), preferably 10 to 90% by mass of the component (a-1) and 10 to 90% by mass of the component (a-2), more preferably 20 to 80% by mass of the component (a-1) and 20 to 80% by mass of the component (a-2), and particularly preferably 35 to 65% by mass of the component (a-1) and 35 to 65% by mass of the component (a-2), each percentage being based on the total amount of the polyamide resin (a-1) and nylon-11 and/or nylon-12 (a-2). If the content of the polyamide resin (a-1) is 5% by mass or more, a sufficient barrier property is obtained, and high strength and impact resistance are obtained if the content is 95% by mass or less. Nylon 11 and nylon 12 in the component (a-2) are highly reactive with the carbodiimide compound (B) because of the end carboxyl group and the end amino group.

The content of water in the polyamide resin composition (A) is regulated to, by drying if necessary, preferably 0.3% by mass or less, more preferably 0.1% by mass or less and still more preferably 0.05% by mass or less. If being 0.3% by mass or less, the reaction between the carbodiimide group and water is prevented and the extrusion defect is not caused to obtain a thermoplastic resin composition with excellent properties. If needed, the polyamide resin composition (A) is dried by a known method, for example, by a method in which the polyamide resin composition (A) is heated at a temperature not higher than the melting point of the polyamide resin, preferably at 160° C. or lower under reduced pressure in a heating tumbler equipped with a vacuum pump (rotary vacuum vessel) or a vacuum dryer, although not particularly limited thereto.

Examples of the carbodiimide compound (B) having two or more carbodiimide groups, which is added to the polyamide resin composition (A), include aromatic, aliphatic or alicyclic polycarbodiimide compounds produced by various methods. Preferred is an aliphatic or alicyclic polycarbodiimide compound because of its good melt-kneading property in the extrusion operation, and more preferred is an aliphatic polycarbodiimide compound.

The carbodiimide compound (B) is produced by the decarboxylating condensation of an organic polyisocyanate, for example, a method in which the decarboxylating condensation of an organic polyisocyanate is allowed to proceed at about 70° C. or higher in an inert solvent or without using solvent in the presence of a carbodiimidation catalyst.

Examples of the organic polyisocyanate to be used as a raw material for synthesis of the carbodiimide compound (B) include an aromatic diisocyanate, an aliphatic diisocyanate, an alicyclic diisocyanate, and a mixture thereof. Examples thereof include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane 1,4-diisocyanate, xylylene diisocyanate, isophorone diisocyanate, dicyclohexylmethane 4,4-diisocyanate, methylcyclohexane diisocyanate, tetramethylxylylene diisocyanate, 2,6-diisopropylphenyl isocyanate and 1,3,5-triisopropylbenzene 2,4-diisocyanate.

An end capping agent such as monoisocyanate may be used to control the polymerization degree of the carbodiimide compound (B) by capping its terminal end. Examples of the monoisocyanate include phenyl isocyanate, tolyl isocyanate, dimethylphenyl isocyanate, cyclohexyl isocyanate, butyl isocyanate and naphthyl isocyanate.

The end capping agent is not particularly limited to the above monoisocyanates, and any active hydrogen compounds capable of reacting with isocyanates are usable. Examples of the active hydrogen compounds include aliphatic, aromatic and alicyclic compounds, for example, a compound having —OH group such as methanol, ethanol, phenol, cyclohexanol, N-methyl ethanolamine, polyethylene glycol monomethyl ether and polypropylene glycol monomethyl ether; a secondary amine such as diethylamine and dicyclohexylamine; a primary amine such as butylamine and cyclohexylamine, a carboxylic acid such as succinic acid, benzoic acid and dichlorohexanecarboxylic acid, a thiol such as ethyl mercaptan, allyl mercaptan and thiophenol; and an epoxy group-containing compound.

Examples of the carbodiimidation catalyst include a phospholene oxide such as 1-phenyl-2-phospholene 1-oxide, 3-methyl-1-phenyl-2-phospholene 1-oxide, 1-ethyl-2-phospholene 1-oxide, 3-methyl-2-phospholene 1-oxide and 3-phospholene isomers of these compounds, and a metal catalyst such as tetrabutyl titanate, with 3-methyl-1-phenyl-2-phospholene 1-oxide being preferred because of its high catalytic activity.

In the thermoplastic resin composition of the present invention, the carbodiimide compound (B) may be reacted with the polyamide resin composition (A) or the polyamide resin (a-1). During the melt kneading of the polyamide resin (a-1), nylon-11 and/or nylon-12 (a-2) and the carbodiimide compound (B), (I) the polyamide resin (a-1) and nylon-11 and/or nylon-12 (a-2) are bonded to each other via the carbodiimide compound (B), or (II) the polyamide resin (a-1) and nylon-11 and/or nylon-12 (a-2) respectively react with the carbodiimide compound (B). Therefore, the compatibility between the polyamide resin (a-1) and nylon-11 and/or nylon-12 (a-2) is enhanced by the action of the carbodiimide compound (B). Such an increased compatibility enables a uniform melt kneading of the barrier polyamide having a m-xylylene skeleton with nylon-11 and/or nylon-12 having an excellent flexibility and a high impact strength, which has been hitherto difficult, thereby providing a thermoplastic resin composition excellent in the barrier property, strength and impact resistance.

The thermoplastic resin composition contains the carbodiimide compound (B) in an amount of from 0.1 to 10 parts by mass, preferably from 0.2 to 8 parts by mass and more preferably from 0.3 to 5 parts by mass per 100 parts by mass of the polyamide resin composition (A).

The relative viscosity of the thermoplastic resin composition is preferably from 1.7 to 4.0 and more preferably from 1.9 to 3.8. The relative viscosity was measured by the method described below.

The thermoplastic resin composition is melt-kneaded and then made into a shaped article by extrusion or injection molding. Since the addition amount of the carbodiimide compound (B) is 0.1 part by mass or more, the thermoplastic resin composition is sufficiently melt-kneaded and causes no drawback such as uneven extrusion. By limiting the addition amount to 10 parts by mass or less, the extrusion difficulties due to an excessive increase in the viscosity can be avoided.

The thermoplastic resin composition may also contain reinforcing fibers such as glass fibers, nucleating agent, lubricant, mold-releasing agent, antioxidant, processing stabilizers, heat stabilizer, ultraviolet absorber, phyllosilicate, inorganic or organic metal salt of Co, Mn, Zn, etc., and complex unless the object of the present invention is adversely affected.

The polyamide resin composition (A) is melt-kneaded with the carbodiimide compound (B) by using any type of extruder generally employed such as a single-screw extruder and a twin-screw extruder, preferably by using a twin-screw extruder in view of the productivity and flexibility.

The melt-kneading temperature is preferably from 200 to 300° C. and the residence time is preferably 10 min or less. The melt-kneading is preferably conducted by using a screw having at least one zone which has a reverse screw element and/or a kneading disk and by holding a part of the material being kneaded at such a zone. If the melt-kneading temperature is within the above range, the extrusion and kneading defects and the decomposition of the material are prevented.

The thermoplastic resin composition of the present invention may be made into various shapes such as tubes, hoses and parts by a known method, for example, by a forming or molding method such as extrusion using an extruder, injection molding, press molding, direct blow molding, rotational molding, sandwich molding and two-color molding.

The shaped article of the present invention is produced from the thermoplastic resin composition and includes a layer or layers having excellent barrier property, strength and impact resistance. The shaped article may be either a single-layer article or a multilayer article, with a multilayer article being preferred because of its high strength, which is composed of at least one layer of the thermoplastic resin composition and at least one reinforcing layer laminated thereon which is produced from polyolefin, polystyrene, polyester, polycarbonate, polyamide or fluorine-containing resin.

Examples of the polyolefins for the reinforcing layer include linear low-density polyethylene, low-density polyethylene, medium-density polyethylene, high-density polyethylene and ultrahigh molecular weight high-density polyethylene, polypropylene, copolymer of two or more olefins selected from ethylene, propylene, butene, etc., a mixture thereof, a modified fluorine resin and polyamide. The polyolefin, polyester, polycarbonate, polyamide and fluorine resin mentioned above may be mixed with each other, mixed with another resin such as elastomer, or mixed with an additive such as carbon black and a flame retardant.

An adhesive resin layer (adhesive layer) may be disposed between the layers of the multilayer article, for example, between the thermoplastic resin composition layer and the reinforcing layer. When the thermoplastic resin composition layer and a polyolefin reinforcing layer are bonded, the adhesive resin for the adhesive layer may include a modified polyethylene or polypropylene and a copolymer of olefins such as ethylene, propylene and butene. To bond the thermoplastic resin composition layer and a reinforcing layer made of polyester or polycarbonate, the adhesive resin such as an ethylene-vinyl acetate copolymer, an alkali metal or alkaline earth metal-crosslinked ethylene-acrylic acid copolymer and an ethylene-acrylic acid ester copolymer is usable, although not limited thereto.

The thicknesses of the layers in the multilayer shaped article may be selected according to the shape of the multilayer shaped article. The average thickness of the thermoplastic resin composition layer is preferably from 0.005 to 5 mm, the average thickness of the reinforcing layer is preferably from 0.005 to 10 mm, and the average thickness of the adhesive layer is preferably from 0.005 to 5 mm.

EXAMPLES

The present invention will be described in more detail below with reference to the following examples.

In the following examples and comparative examples, the polyamide resin composition (A), the thermoplastic resin composition and the film were evaluated by the following methods.

(1) End Carboxyl Concentration

A sample 0.3 to 0.5 g accurately weighed was dissolved in 30 cc of benzyl alcohol at 160 to 180° C. while stirring under a nitrogen flow. The resulting solution was cooled to 80° C. or lower under a nitrogen flow, mixed with 10 cc of methanol while stirring, and then subjected to neutralization titration with a 1/100 N sodium hydroxide aqueous solution to determine the end carboxyl concentration.

(2) End Amino Concentration

A sample of 0.3 to 0.5 g accurately weighed was dissolved in 30 cc of a phenol/ethanol (4/1 by volume) mixed solvent at 20 to 30° C. while stirring. After complete dissolution, the solution was subjected to neutralization titration with a 1/100 N hydrochloric acid using an automatic titrater available from Hiranuma Sangyo Co., Ltd., to determine the end amino concentration.

(3) Relative Viscosity

Accurately weighed one gram of a sample was dissolved in 100 cc of 96% sulfuric acid at 20 to 30° C. under stirring. Immediately after complete dissolution, 5 cc of the solution was placed in a Canon Fenske viscometer, and the viscometer was allowed to stand in a thermostatic chamber maintained at 25±0.03° C. for 10 min. Then, a dropping time (t) of the solution was measured. Also, a dropping time ($t_0$) of the 96% sulfuric acid was measured. The relative viscosity was calculated from the measured t and $t_0$ according to the following formula:

$$\text{Relative Viscosity} = t/t_0.$$

(4) Water Content

The water content was measured at 235° C. (melting point: −5° C.) for 30 min in a nitrogen atmosphere using a water content meter "AQUACOUNTER AQ-2000" available from Hiranuma Sangyo Co., Ltd.

(5) Extrudability

Using a Labo Plastomil (available from Toyo Seiki Seisaku-Sho, Ltd.; 20 mmφ twin-screw extruder), a film was produced at an extrusion temperature of 260° C., a screw rotating speed of 80 rpm and an output rate of 1.2 kg/h to observe and evaluate the extrusion state according to the following ratings.

A: Good extrudability
B: Defective (not extruded into film)

(6) Tensile Properties

A strip of film having a width of 10 mm and a length of 120 mm was measured for the breaking strength (kgf/mm$^2$), the elongation at break (%) and the elastic modulus (kgf/mm$^2$) according to ASTM-D882 in an atmosphere at 23° C. and 50% RH at a chuck interval of 50 mm and a pulling speed of 50 mm/min using Strograph V1-C manufactured by Toyo Seiki Seisaku-Sho, Ltd.

(7) Impact Puncture Strength

Measured at 23° C. and 50% RH using a film impact tester "ITF-60" manufactured by Tosoku Seimitsu Kogyo, Co., Ltd. (falling dart: spherical tip end of ½ inch (1.25 mm) diameter).

(8) Oxygen-Barrier Property (Oxygen Permeability)

Measured according to ASTM D3985 at 23° C., a relative humidity of 60% (film inside) and an ambient relative humidity of 50% using an oxygen permeability tester "OX-TRAN 10/50A" manufactured by Modern Controls, Inc.

(9) Fuel-Barrier Property (Fuel Penetration)

Two pieces of 12 cm×15 cm films were superimposed with one on the other and then heat-sealed at three sides with a sealing width of 10 mm to form a bag. After filling 60 g of fuel (isooctane/toluene/ethanol=45/45/10 by volume), the open side of the bag was heat-sealed with a sealing width of 10 mm. The fuel-filled bag was allowed to stand in an explosion-proof type thermo-hygrostatic chamber under conditions of 28° C./65% RH for 10 days. The mass of the fuel-filled bag was measured before and after the 10-day standing. The fuel permeation amount (g/day) was determined from the loss of mass.

Example 1

A mixed composition containing 70% by mass of poly-m-xylylene adipamide (polyamide resin I) and 30% by mass of nylon 12 was prepared.
Poly-m-Xylylene Adipamide
"MX Nylon S6001" manufactured by Mitsubishi Gas Chemical Company, Inc., a polyamide resin produced from m-xylylenediamine and adipic acid.
Relative viscosity: 2.1
Water content: 0.03% by mass
End amino concentration: 30 µeq/g
End carboxyl concentration: 75 µeq/g
Nylon 12
"UBE 3030XA" manufactured by UBE Industries, Ltd.
Relative viscosity: 2.2
End amino concentration: 22 µeq/g
End carboxyl concentration: 51 µeq/g The mixed composition (100 parts by mass) and 1 part by mass of an aliphatic polycarbodiimide compound (polycarbodiimide compound I, "Carbodilite LA-1" manufactured by Nisshinbo Industries, Inc.) were dry-blended to prepare a thermoplastic resin composition. Then, the thermoplastic resin composition was fed into a twin-screw extruder through a metering feeder at a feed rate of 6 kg/h. The twin-screw extruder was mounted with strong kneading type screws having a cylinder diameter of 37 mm and a retention zone composed of reverse screw elements. The thermoplastic resin composition was melt-kneaded at a cylinder temperature of 270° C. and a screw rotating speed of 100 rpm, and extruded into molten strands, which were then cooled with a cooling air, solidified and pelletized to produce pellets of the thermoplastic resin composition.

The obtained pellets were fed into a T-die twin-screw extruder having a cylinder diameter of 20 mm through a metering feeder at a feed rate of 1.2 kg/h. The pellets were melt-kneaded in the extruder at a cylinder temperature of 260° C. and a screw rotating speed of 80 rpm, and then extruded from the T-die in the form of film. The extruded film was cooled and solidified on a cooling roll at 70° C. while taking up it at a speed of 2.7 m/min, thereby obtaining a film having a thickness of 80 µm. The evaluation results of the obtained thermoplastic resin composition and film are shown in Table 1.

Example 2

The same procedure as in Example 1 was repeated except for using a polyamide resin composition of 60% by mass of the polyamide resin I and 40% by mass of nylon-12, thereby obtaining a film. The evaluation results of the obtained thermoplastic resin composition and film are shown in Table 1.

Example 3

In the same manner as in Example 1, 100 parts by mass of a polyamide resin composition of 30% by mass of the polyamide resin I and 70% by mass of nylon-12 and 0.8 part by mass of the polycarbodiimide compound I were melt-kneaded, cooled, solidified and pelletized, thereby producing pellets of the thermoplastic resin composition. The obtained pellets were fed to a T-die twin-screw extruder having a cylinder diameter of 20 mm, and extruded into a film in the same manner as in Example 1. The evaluation results of the obtained thermoplastic resin composition and film are shown in Table 1.

Example 4

Pellets of a thermoplastic resin composition were produced by melt-kneading 100 parts by mass of a mixed composition of 45% by mass of the polyamide resin I and 55% by mass of nylon-11 ("Rilsan BES VOA" available from ATOFINA Inc.; relative viscosity: 2.3; end amino concentration: 10 µeq/g; end carboxyl concentration: 143 µeq/g), and 0.7 part by mass of the polycarbodiimide compound I, cooling, solidifying and pelletizing. The obtained pellets were fed to a T-die twin-screw extruder having a cylinder diameter of 20 mm and extruded into a film in the same manner as in Example 1. The evaluation results of the obtained thermoplastic resin composition and film are shown in Table 1.

Comparative Example 1

The polyamide resin I was fed into a T-die twin-screw extruder having a cylinder diameter of 20 mm through a metering feeder at a feed rate of 1.2 kg/h. The polyamide resin I was melt-kneaded in the extruder at a cylinder temperature of 260° C. and a screw rotating speed of 80 rpm and then extruded from the T-die in the form of film, which was cooled and solidified on a cooling roll maintained at 70° C. while taking up it at a rate of 2.7 m/min, thereby obtaining a film having a thickness of 80 µm. The evaluation results of the polyamide resin I and the film are shown in Table 1.

Comparative Example 2

The same procedure as in Comparative Example 1 was repeated except that nylon-12 was solely fed to a biaxial stretching machine without using the polyamide resin I, thereby obtaining a film. The evaluation results of nylon-12 and the film are shown in Table 1.

Comparative Example 3

It was attempted that a polyamide resin composition obtained by dry-blending 60% by mass of the polyamide resin I and 40% by mass of nylon-12 was formed into a film. However, the resin composition failed to be formed into a film because of its poor extrudability. The evaluation results of the polyamide resin composition are shown in Table 1.

Comparative Example 4

Pellets of a thermoplastic resin composition were produced by melt-kneading 100 parts by mass of a polyamide resin composition of 60% by mass of the polyamide resin I and 40% by mass of nylon-12 and 1 part by mass of a monocarbodiimide compound (N,N'-bis(2,6-diisopropylphenyl)carbodiimide available from Tokyo Kasei Kogyo Co., Ltd.), cooling, solidifying and pelletizing. The obtained pellets were fed to a T-die twin-screw extruder having a cylinder diameter of 20 mm, and formed into a film in the same manner as in Example 1. The evaluation results of the obtained thermoplastic resin composition and film are shown in Table 1.

TABLE 1

|  | Examples | | | |
|---|---|---|---|---|
|  | 1 | 2 | 3 | 4 |
| Polyamide resin composition | | | | |
| polyamide resin I (mass %) | 70 | 60 | 30 | 45 |
| nylon-12 (mass %) | 30 | 40 | 70 | |
| nylon-11 (mass %) | | | | 55 |
| water content (mass %) | 0.05 | 0.05 | 0.05 | 0.05 |
| Thermoplastic resin composition | | | | |
| polyamide resin composition (parts by mass) | 100 | 100 | 100 | 100 |
| polycarbodiimide compound (parts by mass) | 1 | 1 | 0.8 | 0.7 |
| monocarbodiimide compound (parts by mass) | | | | |
| end carboxyl concentration ($\mu$eq/g) | 48 | 28 | 20 | 68 |
| end amino concentration ($\mu$eq/g) | 33 | 32 | 28 | 40 |
| relative viscosity | 2.7 | 3.1 | 3.0 | 2.6 |
| extrudability | A | A | A | A |
| Properties of film | | | | |
| breaking strength (kgf/mm$^2$) | 6 | 5 | 9 | 4 |
| elongation at break (%) | 70 | 240 | 460 | 130 |
| elastic modulus (kgf/mm$^2$) | 230 | 200 | 120 | 170 |
| impact puncture strength (kgf · cm/80 $\mu$m) | 1.1 | 11 | 38 | 17 |
| oxygen permeability (cc/m$^2$ · day · atm) | 2.0 | 2.8 | 100 | 5.5 |
| fuel penetration (g/day) | 0.2 | 0.3 | 1.0 | 0.6 |

|  | Comparative Examples | | | |
|---|---|---|---|---|
|  | 1 | 2 | 3 | 4 |
| Polyamide resin composition | | | | |
| polyamide resin I (mass %) | 100 | | 60 | 60 |
| nylon-12 (mass %) | | 100 | 40 | 40 |
| nylon-11 (mass %) | | | | |
| water content (mass %) | 0.04 | 0.04 | 0.05 | 0.05 |
| Thermoplastic resin composition | | | | |
| polyamide resin composition (parts by mass) | 100 | 100 | 100 | 100 |
| polycarbodiimide compound (parts by mass) | | | | |
| monocarbodiimide compound (parts by mass) | | | | 1 |
| end carboxyl concentration ($\mu$eq/g) | 75 | 51 | 28 | 28 |
| end amino concentration ($\mu$eq/g) | 30 | 22 | 32 | 32 |
| relative viscosity | 2.3 | 2.2 | — | 2.7 |
| extrudability | A | A | B | A |
| Properties of film | | | | |
| breaking strength (kgf/mm$^2$) | 8 | 9 | — | 5 |
| elongation at break (%) | 3 | 570 | — | 220 |
| elastic modulus (kgf/mm$^2$) | 320 | 80 | — | 200 |
| impact puncture strength (kgf · cm/80 $\mu$m) | 0.8 | >45 | — | 0.9 |
| oxygen permeability (cc/m$^2$ · day · atm) | 1.1 | 300 | — | 2.5 |
| fuel penetration (g/day) | 0.6 | 18 | — | 0.3 |

As is apparent from Table 1, the thermoplastic resin compositions obtained in Examples 1 to 4 containing the polyamide resin I, nylon-11 or nylon-12, and the polycarbodiimide compound were excellent in barrier property, mechanical properties and balance therebetween as compared with those obtained in Comparative Examples 1 and 2 containing only the polyamide resin I or only nylon-12. In addition, in Comparative Example 3 in which no carbodiimide compound was added, the resin composition failed to be formed into a film because of its poor extrudability. Further, in Comparative Example 4 using the monocarbodiimide compound, the impact puncture strength of the resulting film was decreased to 1/10 or less of the impact puncture strength of the film obtained in Example 2 which was produced under the same conditions except for using the polycarbodiimide compound in place of the monocarbodiimide compound.

Industrial Applicability

The thermoplastic resin composition of the present invention is excellent in barrier property, strength and impact resistance, in particular, barrier property to alcohol-containing fuels and is, therefore, suitably used for the production of various shaped articles such as fuel containers, tubes and parts.

What is claimed is:

1. A thermoplastic resin composition comprising
   100 parts by mass of a polyamide resin composition (A) and
   0.1 to 10 parts by mass of a carbodiimide compound (B) having two or more carbodiimide groups,
   wherein the polyamide resin composition (A) comprises
      a polyamide resin (a-1) which is constituted by diamine units 70 mol % or more of which are m-xylylenediamine units and by dicarboxylic acid units 70 mol % or more of which are $C_4$ to $C_{20}$ $\alpha,\omega$-linear aliphatic dicarboxylic acid units, and
      at least one of nylon 11 and nylon 12 (a-2) in amounts of 5 to 65% by mass of component (a-1) and 95 to 35% by mass of component (a-2) each based on a total amount of components (a-1) and (a-2).

2. The thermoplastic resin composition according to claim 1, wherein 0-30 mol % of the dicarboxylic acid units of the polyamide resin (a-1) are isophthalic acid units.

3. The thermoplastic resin composition according to claim 1, wherein polyamide resin composition (A) comprises 0.3% by mass or less of water.

4. The thermoplastic resin composition according to claim 3, produced by melt-kneading said polyamide resin (a-1), said at least one of nylon-11 and nylon-12 (a-2), and said carbodiimide compound (B).

5. The thermoplastic resin composition according to claim 1, wherein the carbodiimide compound (B) is an aliphatic or alicyclic polycarbodiimide compound.

6. The thermoplastic resin composition according to claim 5, produced by melt-kneading said polyamide resin (a-1), said at least one of nylon-11 and nylon-12 (a-2), and said carbodiimide compound (B).

7. A shaped article comprising the thermoplastic resin composition as defined in claim 1.

8. The shaped article according to claim 7, which is a multilayer shaped article having at least one layer comprising the thermoplastic resin composition as defined in claim 1.

9. The thermoplastic resin composition according to claim 1, wherein the polyamide resin composition (A) comprises 35 to 65% by mass of component (a-1) and 35 to 65% by mass of component (a-2) each based on a total amount of components (a-1) and (a-2).

10. The thermoplastic resin composition according to claim 9, produced by melt-kneading said polyamide resin (a-1), said at least one of nylon-11 and nylon-12 (a-2), and said carbodiimide compound (B).

11. The thermoplastic resin composition according to claim 1, wherein the melting point of polyamide resin (a-1) is 160 to 240° C.

12. The thermoplastic resin composition according to claim 1, wherein the melting point of polyamide resin (a-1) is 180 to 230° C.

13. The thermoplastic resin composition according to claim 1, wherein the glass transition point of the polyamide resin (a-1) is 80 to 130° C.

14. The thermoplastic resin composition according to claim 1, wherein polyamide resin composition (A) comprises 0.1% by mass or less of water.

15. The thermoplastic resin composition according to claim 1, wherein carbodiimide compound (B) is an aliphatic polycarbodiimide compound.

16. The thermoplastic resin composition according to claim 1, wherein carbodiimide compound (B) is an alicyclic polycarbodiimide compound.

17. The thermoplastic resin composition according to claim 1, wherein carbodiimide compound (B) is present in 0.2 to 8 parts by mass.

18. The thermoplastic resin composition according to claim 1, wherein polyamide resin composition (A) comprises nylon 11.

19. The thermoplastic resin composition according to claim 1, wherein polyamide resin composition (A) comprises nylon 12.

20. The thermoplastic resin composition according to claim 1, produced by melt-kneading said (a-1), said at least one of nylon-11 and nylon-12, and said carbodiimide compound (B).

* * * * *